UNITED STATES PATENT OFFICE.

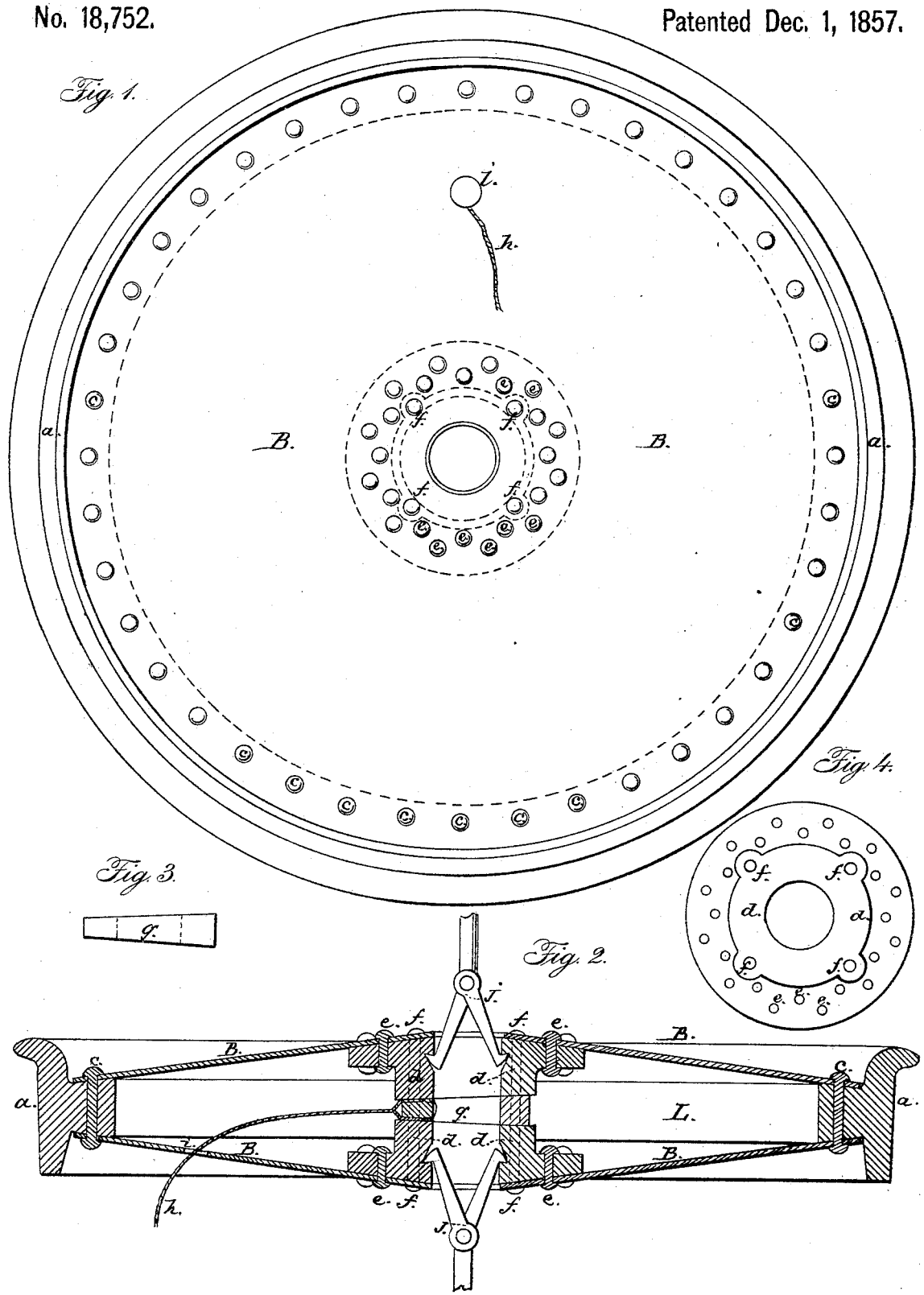

A. B. LATTA, OF CINCINNATI, OHIO.

RAILROAD-CAR WHEEL.

Specification of Letters Patent No. 18,752, dated December 1, 1857.

*To all whom it may concern:*

Be it known that I, A. B. LATTA, of Cincinnati, in the county of Hamilton and State of Ohio, have invented a new and useful Improvement in what I denominate "Tension Car-Wheels;" and I do hereby declare that the following is a full, clear, and exact description thereof, reference being had to the accompanying drawings and to the letters of reference marked thereon and made to form part of this specification.

Similar letters refer to like parts of the improvement.

The improved wheel is composed of a cast iron chilled rim, two dished wrought iron plates and a divided hub or eye, and I am aware of wrought iron plates and a rim having been used before. But the nature of my improvement consists in constructing the wheel in such a manner as to make the two dished wrought iron plates bind the rims together for giving it additional strength and is effected after uniting the parts of the wheel together by drawing the dished wrought iron plates outward at their center and thus holding them, as will be hereinafter specified, which drawing outward and holding contracts the dished wrought iron plates at their periphery where they are united to the rim and with the tension of the dished wrought iron plates thus given draws all points of the rim toward the center of the wheel and binds it together, which increases its strength and prevents it from so readily breaking, as it would if the tension of the wrought plates were not exerted upon it as described.

To enable others skilled in the art to make and use my improvement I will proceed to describe its construction and operation by referring direct to the accompanying drawings.

Figure 1 is a face view of the wheel in a complete state. Fig. 2 is a sectional view of the wheel through its diameter showing fully its structure; and Fig. 3 is an inside face view of one of the hub pieces to be riveted to the inside of the dished wrought iron plates.

$a, a,$ represents a chilled cast iron rim furnished with a dovetailed flange (L) on its inside to which the dished wrought iron plates (B, B) are attached with the rivets (C C) at their peripheries as fully represented in Fig. 2.

$d, d,$ are the hub pieces attached to the inside and center of the plates B, B, with rivets ($e$ $e$) and the inside ends of the hub pieces are cut at such an angle that the space made between the two ends has the form of a wedge as represented at ($g$) which is a ring placed between the ends of the hubs for holding the plates B, B, apart or in a tension state.

The ring ($g$) is placed between the plates B, before they are riveted to the rim and provided with a wire ($h$) or cord and placed out through the hole ($i$) which hole can be made in either plate opposite the narrow part of the space between the end of the hubs ($d$ $d$) for the purpose of drawing the wedged shaped ring between the ends of the hub pieces ($d$ $d$) after the plates B, B, are riveted to the rim and then drawn apart with the dogs J, J, with any suitable machinery to operate on the said dogs for obtaining the tension on the plate (B, B,) as and for purposes mentioned before and when the ring ($g$) is drawn to its proper place between the ends of the hubs $d, d,$ it is held there by means of four bolts made to pass through the holes $f, f, f, f,$ in the hubs ($d$) by having the said bolts to come against the periphery of the ring as represented in Fig. 1, at four points which will prevent the ring from slipping out of its place. The wheel is then bored out and applied to use in the ordinary manner.

What I claim as my improvement and desire to secure by Letters Patent is:

The wheel constructed as represented in its parts for the purpose of producing a tension stress on the dished wrought iron plates B, B, for binding the rim together by drawing the plates B, B, apart in the center and holding them by the ring ($g$) as represented and substantially for purposes specified in the foregoing specification.

A. B. LATTA.

Witnesses:
W. H. THOMPSON,
W. CHEDSEY.